United States Patent
Noh

(10) Patent No.: US 9,273,971 B2
(45) Date of Patent: Mar. 1, 2016

(54) APPARATUS AND METHOD FOR DETECTING TRAFFIC LANE USING WIRELESS COMMUNICATION

(71) Applicant: Hyundai Motor Company, Seoul (KR)

(72) Inventor: Dong Gyu Noh, Dongducheon-si (KR)

(73) Assignee: Hyundai Motor Company, Seoul (KR)

( * ) Notice: Subject to any disclaimer, the term of this patent is extended or adjusted under 35 U.S.C. 154(b) by 130 days.

(21) Appl. No.: 14/010,829

(22) Filed: Aug. 27, 2013

(65) Prior Publication Data

US 2014/0358420 A1 Dec. 4, 2014

(30) Foreign Application Priority Data

May 28, 2013 (KR) .......................... 10-2013-0060352

(51) Int. Cl.
  *G01C 21/28* (2006.01)
  *G05D 1/02* (2006.01)
  *G06K 9/00* (2006.01)
  *G01C 21/36* (2006.01)

(52) U.S. Cl.
  CPC ............ *G01C 21/28* (2013.01); *G01C 21/3658* (2013.01); *G05D 1/0212* (2013.01); *G06K 9/00798* (2013.01); *G05D 1/0231* (2013.01); *G05D 1/0257* (2013.01); *G05D 1/0287* (2013.01)

(58) Field of Classification Search
  CPC ... G01C 21/28; G05D 1/0287; G05D 1/0291; G05D 1/0293; G05D 1/0295; G05D 1/0212; G05D 1/0231; G05D 1/0257
  USPC ............ 701/23, 24, 25, 26, 28, 302, 422, 482
  See application file for complete search history.

(56) References Cited

U.S. PATENT DOCUMENTS

| 5,331,561 | A  | * | 7/1994 | Barrett et al. ................... 701/23 |
| 6,397,141 | B1 | * | 5/2002 | Binnig .......................... 701/117 |
| 6,882,287 | B2 |   | 4/2005 | Schofield |
| 8,229,663 | B2 | * | 7/2012 | Zeng et al. .................... 701/301 |
| 8,352,111 | B2 | * | 1/2013 | Mudalige ...................... 701/117 |
| 8,352,112 | B2 | * | 1/2013 | Mudalige ...................... 701/117 |
| 8,447,437 | B2 | * | 5/2013 | Chiang ......................... 340/903 |
| 8,457,827 | B1 | * | 6/2013 | Ferguson et al. ............... 701/23 |
| 8,473,144 | B1 | * | 6/2013 | Dolgov et al. .................. 701/23 |
| 8,798,907 | B2 | * | 8/2014 | Shida ........................... 701/301 |
| 8,825,265 | B1 | * | 9/2014 | Ferguson et al. ............... 701/26 |

(Continued)

FOREIGN PATENT DOCUMENTS

| JP | 2007-126086 A | 5/2007 |
| JP | 2007-156755 A | 6/2007 |

(Continued)

*Primary Examiner* — Tuan C. To
*Assistant Examiner* — Dale W Hilgendorf
(74) *Attorney, Agent, or Firm* — Mintz Levin Cohn Ferris Glovsky and Popeo, P.C.; Peter F. Corless

(57) ABSTRACT

An apparatus and a method for detecting a traffic lane using wireless communication is provided and includes a sensor unit including an image recognition sensor and a radar sensor. In addition, a controller is configured to wirelessly communicate with at least one of a plurality of other vehicles and generate road driving information regarding a traveling vehicle after confirming a reliability of the at least one other vehicle using traffic lane recognition information received from the at least other vehicle. The controller is configured to confirm a traffic lane of the traveling vehicle based on the reliability and output the road driving information.

13 Claims, 6 Drawing Sheets

| RELIABILITY 1 | EQUIPPED WITH AN IMAGE RECOGNITION SENSOR & POSITION AT END LANE |
|---|---|
| RELIABILITY 2 | EQUIPPED WITH A PLURALITY OF SENSORS & DISTANCE FROM OWN VEHICLE IS WITHIN 100M |
| RELIABILITY 3 | EQUIPPED WITH A PLURALITY OF SENSORS & DISTANCE FROM OWN VEHICLE EXCEED 100M |
|  | EQUIPPED WITH A SINGLE SENSOR & DISTANCE FROM OWN VEHICLE IS WITHIN 100M |
| RELIABILITY 4 | THE OTHERS |

(56) References Cited

U.S. PATENT DOCUMENTS

| | | | |
|---|---|---|---|
| 8,880,272 B1* | 11/2014 | Ferguson et al. | 701/26 |
| 2006/0161341 A1* | 7/2006 | Haegebarth et al. | 701/209 |
| 2008/0009965 A1* | 1/2008 | Bruemmer et al. | 700/245 |
| 2009/0309757 A1* | 12/2009 | Mudalige et al. | 340/905 |
| 2010/0256835 A1* | 10/2010 | Mudalige | 701/2 |
| 2010/0256836 A1* | 10/2010 | Mudalige | 701/23 |
| 2010/0256852 A1* | 10/2010 | Mudalige | 701/24 |
| 2013/0030688 A1* | 1/2013 | Shimizu et al. | 701/301 |
| 2014/0100734 A1* | 4/2014 | Yamashiro | 701/23 |

FOREIGN PATENT DOCUMENTS

| | | |
|---|---|---|
| KR | 10-2008-0004170 A | 1/2008 |
| KR | 10-2010-0117861 | 11/2010 |
| KR | 10-2012-0050772 | 5/2012 |

* cited by examiner

| RELIABILITY 1 | EQUIPPED WITH AN IMAGE RECOGNITION SENSOR & POSITION AT END LANE |
|---|---|
| RELIABILITY 2 | EQUIPPED WITH A PLURALITY OF SENSORS & DISTANCE FROM OWN VEHICLE IS WITHIN 100M |
| RELIABILITY 3 | EQUIPPED WITH A PLURALITY OF SENSORS & DISTANCE FROM OWN VEHICLE EXCEED 100M |
| | EQUIPPED WITH A SINGLE SENSOR & DISTANCE FROM OWN VEHICLE IS WITHIN 100M |
| RELIABILITY 4 | THE OTHERS |

Fig.4

| CONDITION 1 | EQUIPPED WITH A PLURALITY OF SENSORS & WITHIN 100M FROM REQUEST VEHICLE |
|---|---|
| CONDITION 2 | EQUIPPED WITH A PLURALITY OF SENSORS & EXCEED 100M FROM REQUEST VEHICLE |
| | EQUIPPED WITH A SINGLE SENSOR & WITHIN 100M FROM REQUEST VEHICLE |

Fig.6

APPARATUS AND METHOD FOR DETECTING TRAFFIC LANE USING WIRELESS COMMUNICATION

PRIORITY

This application claims the benefit under 35 U.S.C. §119(a) of a Korean patent application filed in the Korean Intellectual Property Office on May 28, 2013 and assigned Serial No. 2013-0060352, and the entire disclosure of which is hereby incorporated by reference.

BACKGROUND

1. Field of the Invention

The present invention relates to an apparatus and a method for detecting a traffic lane using wireless communication, and more particularly, to an apparatus and a method for detecting a traffic lane using wireless communication that receives the traffic lane recognition information from other vehicles using the wireless communication between vehicles, and detects the traffic lane of the traveling vehicle based on the traffic lane recognition information according to reliability of other vehicles.

2. Description of the Related Art

Generally, to guide a vehicle to remain within a traffic lane, an exact entry into and exit from interchange (IC)/junction (JC), and an exact path to a destination, during driving of the vehicle, a global positioning system (GPS) mounted in a navigation system or sensors mounted in the traveling vehicle such as an image recognition sensor, a radar sensor, and the like are used to estimate the traffic lane in which the vehicle is traveling.

However, when estimating the traffic lane using the GPS, it may be difficult to estimate the exact traffic lane due to error of the GPS. In addition, when estimating the traffic lane using the image recognition sensor or the radar sensor, it may be difficult to estimate the traffic lane on the road on which there are many vehicles, and it may be difficult to estimate the traffic lane while driving in a substantial middle of the road on which there are many traffic lanes.

SUMMARY

The present invention provides an apparatus and a method for detecting a traffic lane using wireless communication that receives the traffic lane recognition information from other vehicles using the wireless communication between vehicles, and detects the traffic lane of the traveling vehicle (e.g., a first vehicle) based on the traffic lane recognition information according to reliability of other vehicles.

In accordance with an aspect of the present invention, an apparatus for recognizing for a traffic lane using wireless communication may include: a communication unit configured to perform a communication with at least one other vehicle (e.g., a second vehicle); a sensor unit equipped with a sensor including an image recognition sensor and a radar sensor; a controller configured to generate road driving information of the traveling vehicle after confirming a reliability of the other vehicle using the traffic lane recognition information received from the other vehicle and confirming a traffic lane of the traveling vehicle according to the reliability; and an output unit configured to output the road driving information under control of the controller. The controller may be configured to confirm the traffic lane of the traveling vehicle when the traffic lane of the traveling vehicle is detected as the same traffic lane equal to or larger than a threshold. The threshold may be determined based on the reliability of the other vehicle. The controller may be configured to confirm the reliability based on a sensor including an image recognition sensor and a radar sensor of the other vehicle, coordinate values for a position of the other vehicle, a distance between the other vehicle and the traveling vehicle, and the traffic lane recognition information including a position of the traffic lane for the other vehicle. The controller may include a global positioning system (GPS) to confirm the coordinate value for the position of the own vehicle. The controller may be configured to confirm the other vehicle as a vehicle having a reliability of 1 when the other vehicle includes the image recognition sensor and positions at an end lane. The controller may be configured to confirm the other vehicle as a vehicle having a reliability of 3 when the other vehicle includes a plurality of sensors and a distance between the other vehicle and the traveling vehicle is within a threshold distance.

In accordance with another aspect of the present invention, a method for recognizing for a traffic lane using wireless communication may include: entering, by a controller, into a traffic lane recognition mode according to an input; receiving, by the controller, traffic lane recognition information from at least one other vehicle via communication; confirming, by the controller, a reliability of the other vehicle from the traffic lane recognition information; confirming, by the controller, a traffic lane of the traveling vehicle according to the reliability; and generating and outputting, by the controller, road driving information including the confirmed traffic lane.

Further, confirming a reliability may include confirming, by the controller, the reliability based on a sensor including an image recognition sensor and a radar sensor of the other vehicle, coordinate values for a position of the other vehicle, a distance between the other vehicle and the traveling vehicle, and the traffic lane recognition information including a position of the traffic lane for the other vehicle.

In addition, confirming a reliability may include confirming, by the controller, the other vehicle as a vehicle having a reliability of 1 when the other vehicle includes the image recognition sensor and positions at an end lane, confirming, by the controller, the other vehicle as a vehicle having a reliability of 3 when the other vehicle includes a plurality of sensors and a distance between the other vehicle and the traveling vehicle is within a threshold distance.

Furthermore, confirming a traffic lane may include: calculating, by the controller, a distance between the other vehicle and the traveling vehicle, and estimating, by the controller, the traffic lane of the traveling vehicle by the calculated distance; and confirming, by the controller, the traffic lane of the traveling vehicle when the traffic lane of the traveling vehicle is estimated as the same traffic lane equal to or larger than a threshold.

BRIEF DESCRIPTION OF THE DRAWINGS

The objects, features and advantages of the present invention will be more apparent from the following detailed description in conjunction with the accompanying drawings, in which:

FIG. 4 is an exemplary view illustrating a condition for classifying a reliability of other vehicle according to the exemplary embodiment of the present invention;

FIG. 6 is an exemplary view illustrating a condition for setting a reliability of traveling vehicle according to the exemplary embodiment of the present invention.

DETAILED DESCRIPTION

Figure 1:
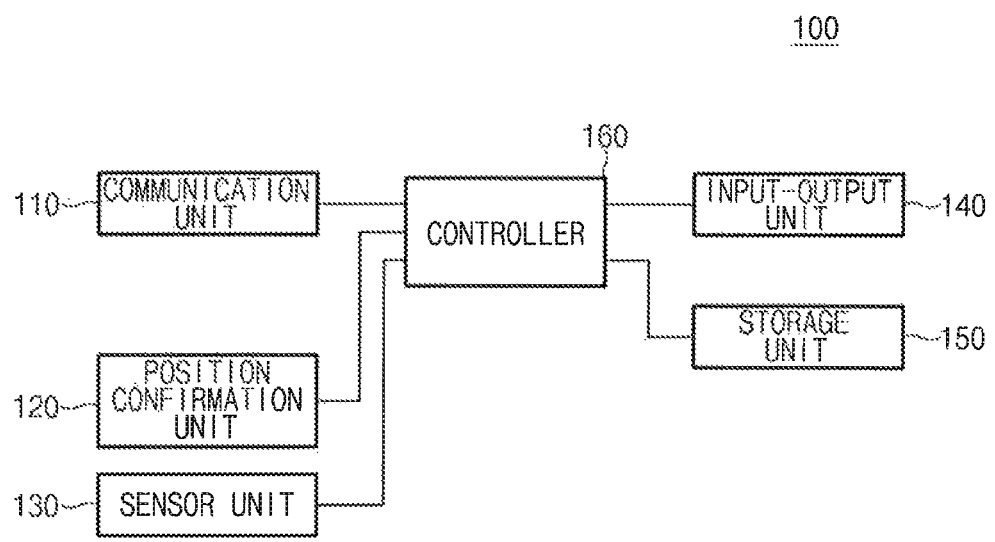
FIG. 1 is an exemplary block diagram illustrating an apparatus for detecting a traffic lane using wireless communication according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 2:
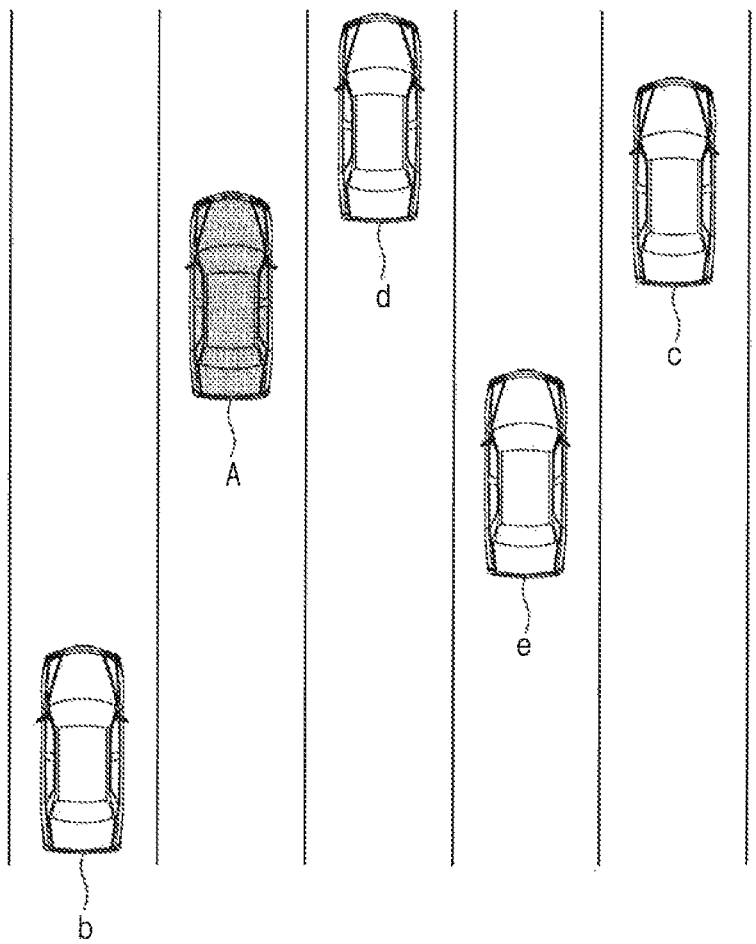
FIG. 2 is an exemplary view illustrating detection of a traffic lane according to the exemplary embodiment of the present invention.

FIG. 1 is an exemplary block diagram illustrating an apparatus for detecting a traffic lane using wireless communication according to an exemplary embodiment of the present invention. FIG. 2 is an exemplary view describing an example of detecting a traffic lane according to the exemplary embodiment of the present invention.

Referring to FIGS. 1 and 2, an apparatus for detecting a traffic lane using wireless communication (hereinafter, referred to as an apparatus for detecting a traffic lane 100) may include a plurality of units executed by a controller 160. The plurality of units may include a communication unit 110, a position confirmation unit 120, a sensor unit 130, an input-output unit 140, and a storage unit 150.

The communication unit 110 may be configured to communicate between vehicles. In particular, the communication unit 110 may include a vehicle to vehicle (V2V) communication module, and may be configured to transmit and receive a lane recognition signal to and from at least one neighboring vehicle positioned within, a predetermined range via the V2V communication. The position confirmation unit 120 may be configured to perform a data communication with a GPS satellite using a global positioning system (GPS) to calculate a coordinate value for a position of the vehicle, and obtain current position information of the corresponding vehicle using the calculated coordinate value.

The sensor unit 130 may include an image recognition sensor and a radar sensor. The image recognition sensor may be configured to collect the external image information (image data) of the vehicle such as the traffic lane, a road, and the like using the image recognition sensors having an infrared camera, a red-green-blue (RGB) camera, a telephoto lens, a wide-angle lens, an imaging device, and the like. The radar sensor may be configured to collect information for the exterior environments of the vehicle using laser radar, which is a light detection and ranging (LiDAR).

The input-output unit 140 may include an input unit and an output unit. The input unit may be configured to sense a user input to generate an input signal that corresponds to the sensed input. The input unit may use an input device such as a keypad, a touch screen, a touch pad, and the like.

Additionally, the output unit may be configured to output a road driving information. In other words, the output unit may be configured to output the road driving information while the first vehicle (e.g., the traveling vehicle) is being driven, the current position of the first vehicle, and the position of the second vehicle (e.g., the other vehicle). The output unit may be configured to output a movement path from origin to destination input from the input unit. The output unit may include an outputting device such as a liquid crystal display (LCD), a thin film transistor liquid crystal display (TFT LCD), an organic light emitting diode (OLED), a flexible display, and the like, and may operate as the output unit of the touch screen when the input unit is a touch screen.

The storage unit 150 may be configured to store a database that includes geographical information and store various programs for controlling the apparatus for detecting the traffic lane 100. In addition, the controller 160 may be configured to confirm the reliability of the other vehicle using the traffic lane recognition information received from the other vehicle, confirm the traffic lane of the traveling vehicle according to the confirmed reliability and then generate the road driving information of the traveling vehicle.

In particular, when a signal for entering into a traffic recognition mode of the own vehicle is received from the input unit of the input-output unit 140, the controller 160 may be configured to enter into the traffic recognition mode to receive message, that is, a traffic lane recognition information from the other vehicle (e.g., the second vehicle) via the communication unit 110. The controller 160 may be configured to analyze the received traffic recognition information to confirm the reliability of the other vehicle, and predict the traffic lane of the traveling vehicle (e.g., the first vehicle) after calculating the distance from the traveling vehicle. The controller 160 may be configured to confirm that the predicted traffic lane is the traveling traffic lane when the predicted number of the traffic lane predictions is greater than the number of threshold times and the same probability that is predicted as the same traffic lane is greater than the threshold value.

For example, in FIG. 2, the controller 160 of the traveling vehicle A may be configured to receive the traffic lane recognition information from the other vehicles b, c, d, and e capable of providing the traffic lane recognition information to the traveling vehicle A. In particular, the controller 160 may be configured to confirm that the reliability of the b and c is 1 in response to confirming that the other vehicles corresponding to b and c are provided with the image recognition sensor and are positioned at end lane. In addition, the controller 160 may be configured to confirm that the reliability of the d and e is 2 in response to confirming that the other vehicles corresponding to d and e are provided with a plurality of sensors and the distance between the other vehicle and the traveling vehicle A is within about 100 m.

The controller 160 may be configured to confirm that the traffic lane of the traveling vehicle A is the second traffic lane as the probability that all the predictive traffic lanes are the same is about 100% in response to predicting that the each traffic lane of the traveling vehicle A is second traffic lane based on the traffic lane recognition information received from the other vehicles b and c that have a reliability which is 1. In particular, the end lane means both ends of the traffic lanes (e.g., the lanes furthest to each side of the road) among the traffic lanes moving in one direction like the other vehicles b and c of FIG. 2.

In addition, the controller 160 may be configured to confirm that the traffic lane of the traveling vehicle A is the second traffic lane as the probability that all the predictive traffic lanes are the same is about 100% in response to predicting that the each traffic lane of the traveling vehicle A is second traffic lane based on the traffic lane recognition information received from the other vehicles d and e that have a reliability which is 2.

In the controller 160, when the reliability of the other vehicle is 1, the predicted traffic lane may be confirmed as a traffic lane in which the traveling vehicle is currently positioned when the greater than about 70% of the predictive traffic lanes are the same. In addition, when the reliability of the other vehicle is 2, the predicted traffic lane may be confirmed as a traffic lane in which the traveling vehicle is currently positioned when the greater than about 80% of the predictive traffic lanes are the same. As described above, the reason for the difference in a magnitude of the same probability according to the reliability is to improve accuracy when predicting the own traffic lane.

When the traffic lane of the traveling vehicle is confirmed by the traffic lane recognition information received from the other vehicle, the controller 160 may be configured to generate the road driving information and obtain map data that corresponds to the current position from the storage unit 150 to correspond to the road driving information and then output via the output unit of the input-output unit 140.

In addition, the controller 160 may be configured to confirm the reliability of the traveling vehicle, to provide the traffic lane recognition information of the traveling vehicle to the vehicle that requests the traffic lane recognition information.

When the signal requesting the traffic lane recognition information is received from the other vehicle via the communication unit 110, the controller 160 may be configured to confirm whether the image recognition sensor exists in the traveling vehicle and whether the traveling vehicle is traveling in the end lane of the current road by analyzing the image data obtained from the image recognition sensor. When the traveling vehicle is confirmed to be traveling in the end lane, the controller 160 may be configured to set the reliability of the traveling vehicle to 1 and may be configured to measure the position of the traveling vehicle.

In addition, the controller 160 may be configured to confirm whether the traveling vehicle includes a plurality of sensors when the image recognition sensor does not exist in the traveling vehicle or when the traveling vehicle is not positioned in the end lane, even when the image recognition sensor exists. When the traveling vehicle is confirmed to include the plurality of sensors, the controller 160 may be configured to measure the distance between the other vehicle requesting the traffic lane recognition information and the traveling vehicle, and set the reliability of the traveling vehicle to 2 when the distance between the vehicles is within about 100 m.

The controller 160 may be configured to set the reliability of the traveling vehicle to 3 when the traveling vehicle includes the plurality of sensors and the distance between the other vehicle requesting the traffic lane recognition information and the traveling vehicle is greater than about 100 m or when the traveling vehicle includes a single sensor and the distance between the other vehicle requesting the traffic lane recognition information and the traveling vehicle is within about 100 m. The controller 160 may be configured to generate the traffic lane recognition information including the set reliability and the measured position of the traveling vehicle as described above and transmit the information to the other vehicle.

In addition, the controller 160 may be configured to set the reliability of the traveling vehicle to 4 (e.g., other than a reference setting the reliability 1 to 3). It is described that the controller 160 is configured to transmit the traffic lane recognition information to the other vehicle when the reliability of the traveling vehicle is 3. However, to improve accuracy of recognition of the traffic lane, when the reliability of the traveling vehicle is 3 or 4, the controller 160 may be configured to not transmit the traffic lane recognition information to the other vehicle.

Figure 3:
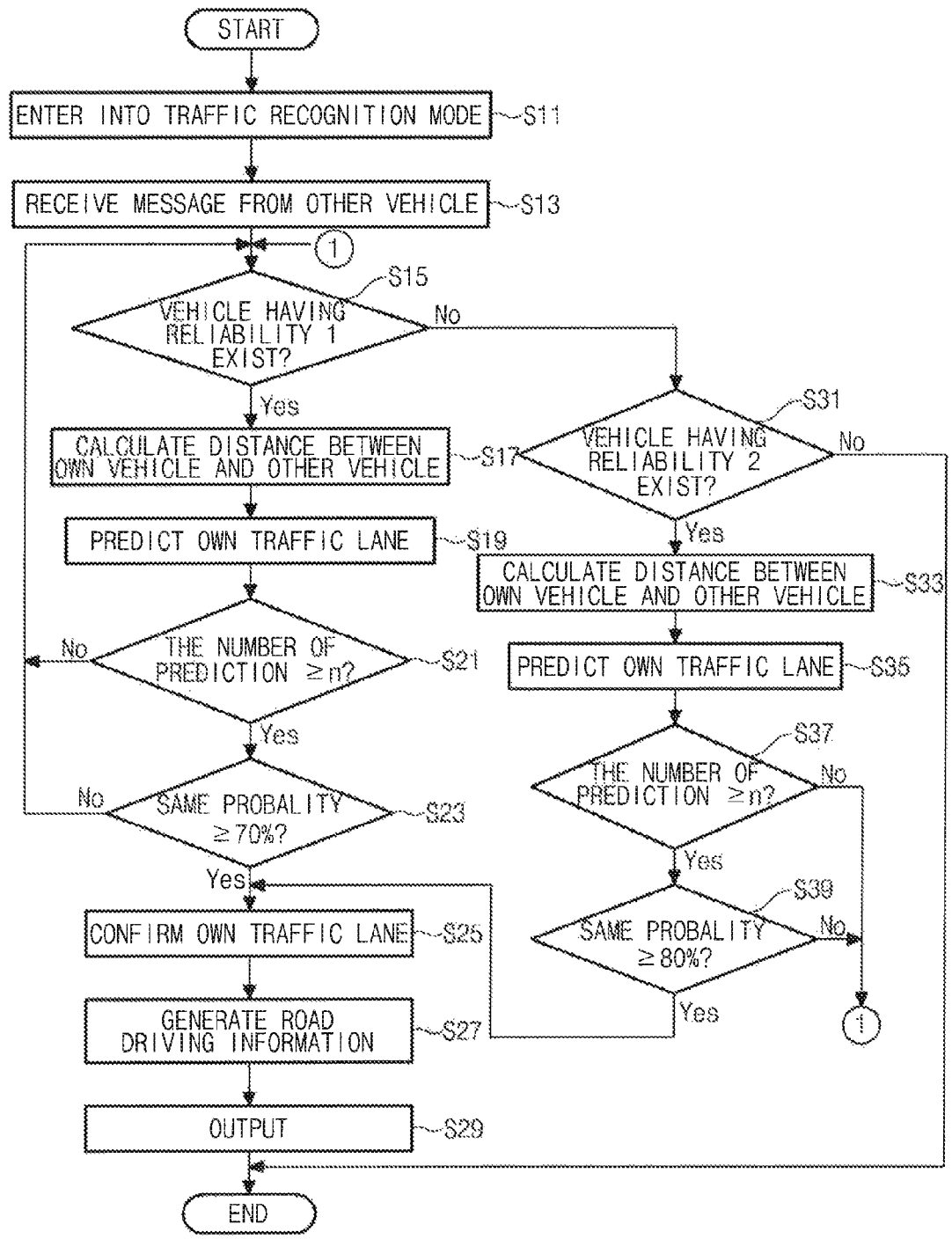
FIG. 3 is an exemplary flow chart describing a method for detecting a traffic lane using wireless communication according to the exemplary embodiment of the present invention.

FIG. 3 is an exemplary flow chart describing a method for detecting a traffic lane using wireless communication according to the exemplary embodiment of the present invention. FIG. 4 is an exemplary view illustrating a condition for classifying a reliability of other vehicle according to the exemplary embodiment of the present invention.

Referring to FIGS. 3 and 4, at step S11, the controller 160 of the traveling vehicle may be configured to enter a traffic lane recognition mode based on user input via the input-output unit 140. At step S13, the controller 160 may be configured to operate the communication unit 110 to receive the message, that is, the traffic lane recognition information for detecting traffic lane of the traveling vehicle from the plurality of other vehicles surrounding the traveling vehicle via a vehicle to vehicle (V2V) communication.

At step S15, the controller 160 may be configured to confirm whether a vehicle having the reliability of 1 exists around (e.g., in the vicinity of) the traveling vehicle by analyzing the traffic lane recognition information received from the other vehicle. In particular, the controller 160 may be configured to confirm whether the reliability of the other vehicle is 1 using the traffic lane recognition information received from the other vehicle. The controller 160 may be configured to confirm the information to confirm the reliability of the other vehicle. The reference to confirm the reliability of the other vehicle is the same as FIG. 4. Specifically, the reference of the reliability is not necessarily limited thereto, but it is obvious to freely set by those skilled in the art.

In addition, the traffic lane recognition information received from the other vehicle may include the data that directly provides the traveling vehicle with information that the reliability of the other vehicle is 1, and may include the information for the equipment of the image recognition sensor of the other vehicle and the information for the positioning at the end lane of the road of the other vehicle to confirm the reliability of the other vehicle by analyzing the traffic lane recognition information in the traveling vehicle.

As the result of step S15, when the reliability of the other vehicle is 1, the controller 160 may proceed to step S17 or when the reliability of the other vehicle is not 1, the controller 160 may proceed to step S31.

At step S17, the controller 160 may be configured to calculate the distance between the other vehicle that has a reliability of 1 and the traveling vehicle. In particular, the controller 160 may be configured to calculate the distance between the vehicles using the coordinate values for the position of the traveling vehicle confirmed from the position confirmation unit 120 and the coordinate values for the position of the other vehicle included in the traffic lane recognition information.

At step S19, the controller 160 may be configured to predict the traffic lane of the traveling vehicle using the calculated distance between the vehicles. For example, when a difference from the other vehicle positioned in first traffic lane occurs as much as about −15 m in an x axis and about 3.5 m in a Y axis based on the traveling vehicle, and the traveling vehicle may be predicted to position in second traffic lane.

At step S21, the controller 160 may be configured confirm whether the number of the traffic lane prediction of the traveling vehicle is greater than the number of threshold times n. To improve accuracy of the traffic lane prediction, the controller 160 may be configured to confirm the traffic lane recognition information received from other different vehicles of n to repeat procedures from step S15 to step S19. When the number of the traffic lane predictions of the traveling vehicle is greater than the number of threshold times, the controller 160 may proceed to step S23.

At step S23, the controller 160 may be configured to determine whether the same probability of predicting that the traveling vehicle is positioned in the second traffic lane is greater than about 70% using the traffic lane recognizing information received from the n different vehicles. In particular, when the probability of predicting that the traveling vehicle is positioned in the second traffic lane is greater than about 70%, the controller 160 may proceed to step S25, and when the probability is less than 70%, the controller 160 may return to step S15. Further, for convenience of explanation, the reference of the same probability is set to about 70%, but it is not necessarily limited thereto.

As the result of step S15, when the reliability of the other vehicle is not 1, the controller 160 may proceed to step S31. At step S31, the controller 160 may be configured to determine whether other vehicle that has a reliability of 2 exists around the traveling vehicle. As the result of step S31, when the other vehicle that has a reliability of 2 exists, the controller 160 may proceed to step S33. Alternatively, the controller 160 may be configured to terminate the process when the other vehicle that has a reliability of 2 does not exist since the information of the other vehicle having a reliability below 3 may not be used to improve accuracy of recognition of the traffic lane.

In particular, at step S31, the controller 160 may be configured to determine the received traffic lane recognition information and detect the other vehicle as the vehicle having a reliability of 2 when the other vehicle is provided with a plurality of sensors including an image recognition sensor, a radar sensor, and the like and when the distance between the other vehicle and the traveling vehicle is within about 100 m.

Specifically, the distance between the other vehicle and the traveling vehicle means a diagonal length between the traveling vehicle and the other vehicle calculated with an x axis distance and a y axis distance of the other vehicle based on the traveling vehicle. In addition, the controller 160 may be configured to detect the other vehicle as the vehicle having a reliability of 3 when the other vehicle is provided with a plurality of sensors and the distance between the other vehicle and the own vehicle is greater than about 100 m or the other vehicle is provided with a single sensor and the distance between the other vehicle and the traveling vehicle is within about 100 m.

At step S33, the controller 160 may be configured to calculate a substantially exact distance between the other vehicle having a reliability confirmed as 2 and the traveling vehicle. In particular, since steps S33 to S37 are similar to steps S17 to S21, respectively, the detailed description thereof will be omitted.

At step S39, the controller 160 may be configured to determine whether the same probability that is identically predicted that the traveling vehicle is positioned in the second traffic lane is greater than about 80% using the traffic lane recognizing information received from the n different vehicles. In particular, when the probability of predicting that the traveling vehicle is positioned in the second traffic lane is greater than about 80%, the controller 160 may proceed to step S25, and when the probability is less than about 80%, the controller 160 may return to step S15. In this case, the reason that the same probability is greater than that of the vehicle having a reliability 1 is to improve the accuracy of the own vehicle.

At step S25, the controller 160 may be configured to confirm that the traffic lane of the traveling vehicle is the second traffic lane, and may proceed to step S27 to generate the road driving information including the above confirmation. At step S29, the controller 160 may be configured to display the traffic lane in which the traveling vehicle is positioned on the map data by obtaining the map data stored in the storage unit 150, and output the position of the other vehicle on the map data.

As described above, the present invention may be configured to recognize the substantially exact traffic lane of the traveling vehicle and confirm the position of the other vehicle in real time to generate real time road driving information, to allow a driver to accurately confirm the traffic lane for stopping a vehicle at a side of the road and may easily enter into and exit from the IC/JC, and may be used at the time of autonomous driving as the accuracy of the traveling traffic lane is improved.

Figure 5:
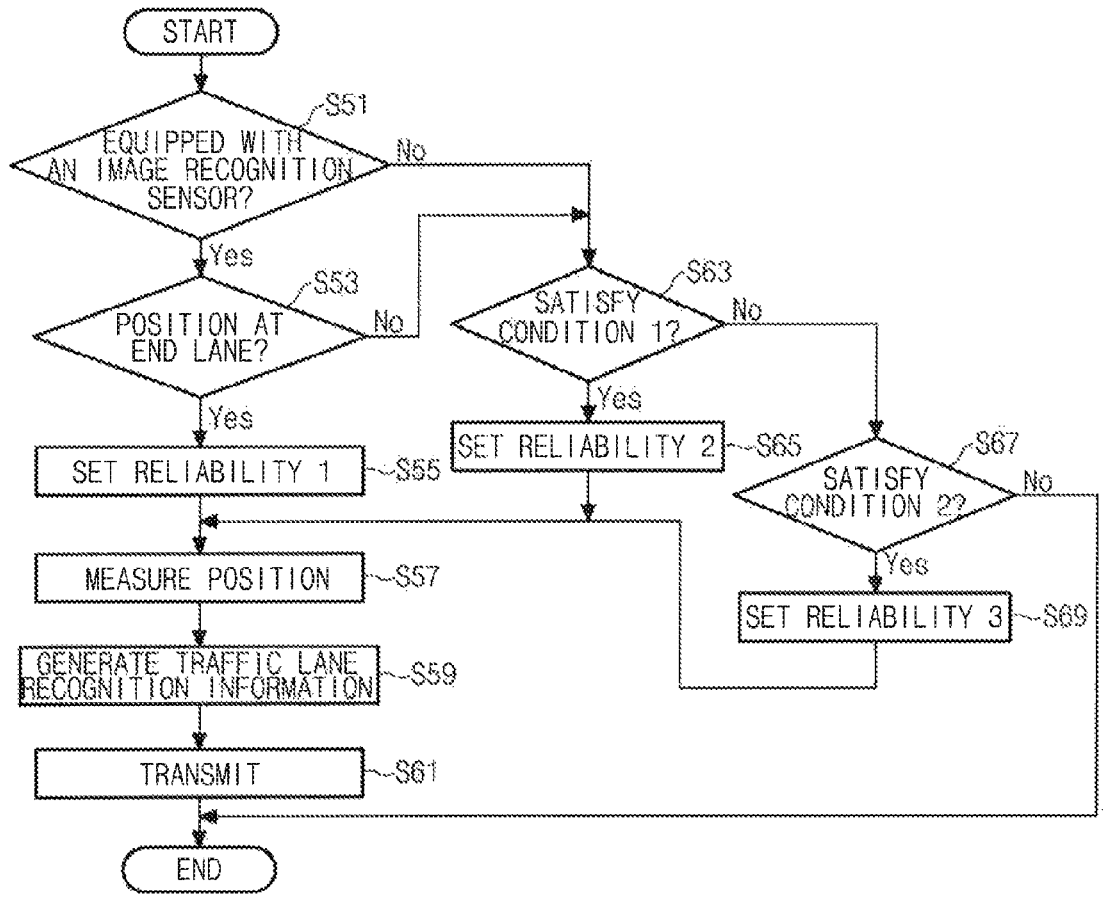
FIG. 5 is an exemplary flow chart describing a method for confirming a reliability of traveling vehicle according to the exemplary embodiment of the present invention.

FIG. 5 is an exemplary flow chart describing a method for confirming a reliability of traveling vehicle according to the exemplary embodiment of the present invention. FIG. 6 is an exemplary view illustrating a condition for setting a reliability of traveling vehicle according to the exemplary embodiment of the present invention.

Referring to FIGS. 5 and 6, as step S51, the controller 160 may be configured to determine whether the image recognition sensor is equipped. Here, the controller 160 may proceed to step S63 when the image recognition sensor is not included within the vehicle, and may proceed to step S53 to determine whether the traveling vehicle is positioned in the end lane when the image recognition sensor is included within the vehicle. In particular, the controller 160 may be configured to determine the image data received from the image recognition sensor and determine whether the traveling vehicle is positioned in the end lane. As the result of step S53, when the traveling vehicle is positioned in the end lane, the controller 160 may proceed to step S55 and set the reliability of the traveling vehicle to 1.

Then, at step S57, the controller may be configured to measure the current position. At step S59, the controller 160 may be configured to generate the traffic lane recognition information including the set reliability and the measured current position. In addition, at step S61, the controller 160 may be configured to operate the communication unit 110 to transmit the generated traffic lane recognition information to the vehicle requesting the traffic lane recognition information. Alternatively, as the result of step S53, when the traveling vehicle is not positioned in the end lane, the controller 160 may proceed to step S63.

At step S63, the controller 160 may be configured to determine whether the traveling vehicle satisfies a condition 1, and may proceed to step S65 to set the reliability of the traveling vehicle to 2 when the traveling vehicle satisfies the condition 1. Specifically, the controller 160 may be configured to determine that the condition 1 is satisfied when the traveling vehicle includes a plurality of sensors and the distance between the other vehicle requesting the traffic lane recognition information and the traveling vehicle is within about 100 m. The condition setting the reliability may be confirmed in FIG. 6.

After step S65, the controller 160 may proceed to step 57 and may sequentially perform up to step S61. Alternatively, at step S63, when the traveling vehicle does not satisfy the condition 1, the controller 160 may proceed to step S67 and may be configured to determine whether the traveling vehicle satisfies the condition 2. As the result of step S67, when the traveling vehicle satisfies the condition 2, the controller 160 may proceed to step S69 to set the reliability of the traveling vehicle to 3, and may proceed to step S57 to sequentially perform up to S61.

As the result of step S67, when the traveling vehicle does not satisfy the condition 2, the controller 160 may be configured to terminate the above process for setting the reliability of the traveling vehicle since the information of the traveling vehicle having a reliability of 4 is not provided to improve accuracy of recognition of the traffic lane using the traffic lane recognition information of the traveling vehicle. Although it may be preferable that the traffic lane recognition information that the reliability below 3 is not utilized to improve accuracy of recognizing for the traffic lane, for convenience of explanation, the step of setting the reliability 3 was described.

In addition, the controller 160 may directly include the reliability determined at the time of generating the traffic lane recognition information into the traffic lane recognition information to generate. However, the controller 160 may also be configured to generate the traffic lane recognition information by including the information (e.g., the sensor equipment, the distance from the vehicle requesting the traffic lane recognition information, and the like) which may be a reference when setting the reliability to determine the reliability from the vehicle receiving the traffic lane recognition information.

As set forth above, the present invention may be configured to receive the traffic lane recognition information from other vehicles using the wireless communication between vehicles and detect the traffic lane of traveling vehicle based on the traffic lane recognition information according to reliability of other vehicles, thereby making it possible to accurately recognize the traffic lane of the traveling vehicle.

In addition, the present invention confirms the position of the traffic lane for other vehicle while recognizing the traffic lane of the traveling vehicle based on the traffic lane recognition information according to the reliability of the other vehicles, thereby making it possible to generate the road driving information in real time.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the accompanying claims,

What is claimed is:

1. An apparatus for recognizing a traffic lane of a traveling vehicle using wireless communication, the apparatus comprising:
   a sensor unit including an image recognition sensor and a radar sensor; and
   a controller configured to:
      communicate wirelessly with at least one other vehicle;
      confirm a reliability classification of the at least one other vehicle;
      receive traffic lane recognition information from the at least one other vehicle;
      generate road driving information by making one or more predictions of the traffic lane of the traveling vehicle based on the traffic lane recognition information received from the at least one other vehicle;
      confirm a particular traffic lane of the traveling vehicle when a number of times for which the particular traffic lane has been predicted is greater than or equal to a threshold that varies according to the reliability classification of the at least one other vehicle; and
      output the road driving information including the confirmed traffic lane.

2. The apparatus of claim 1, wherein the controller is further configured to:
   confirm the reliability classification based on the sensor unit including the image recognition sensor and the radar sensor of the at least one other vehicle, coordinate values for a position of the at least one other vehicle, a distance between the at least one other vehicle and the traveling vehicle, and the traffic lane recognition information that includes a position of the traffic lane for the at least other vehicle.

3. The apparatus of claim 2, wherein the controller is further configured to:

confirm the coordinate values for the position of the at least one other vehicle using a global positioning system (GPS).

4. The apparatus of claim 2, wherein the controller is further configured to:
confirm the at least one other vehicle as a vehicle having a reliability classification of 1 when the at least other vehicle includes the image recognition sensor and is positioned in an end lane.

5. The apparatus of claim 2, wherein the controller is further configured to:
confirm the at least one other vehicle as a vehicle having a reliability classification of 3 when the at least one other vehicle includes a plurality of sensors and a distance between the at least one other vehicle and the traveling vehicle is within a threshold distance.

6. A method for detecting a traffic lane of a traveling vehicle using wireless communication, the method comprising:
entering, by a controller, into a traffic lane recognition mode based on a user input;
receiving, by the controller, traffic lane recognition information from at least one other vehicle via a wireless communication;
confirming, by the controller, a reliability classification of the at least one other vehicle;
generating, by the controller, road driving information by making one or more predictions of the traffic lane of the traveling vehicle based on the traffic lane recognition information received from the at least one other vehicle;
confirming, by the controller, a particular traffic lane of the traveling vehicle when a number of times for which the particular traffic lane has been predicted is greater than or equal to a threshold that varies according to the reliability classification of at least one other vehicle; and
outputting, by the controller, the road driving information including the confirmed traffic lane.

7. The method of claim 6, wherein the confirming of the reliability classification includes:
confirming, by the controller, the reliability classification based on a sensor unit including an image recognition sensor and a radar sensor of the at least one other vehicle, coordinate values for a position of the at least one other vehicle, a distance between the at least one other vehicle and the traveling vehicle, and the traffic lane recognition information that includes a position of the traffic lane for the at least one other vehicle.

8. The method of claim 7, wherein the confirming of the reliability classification includes:
confirming, by the controller, the at least other vehicle as a vehicle having a reliability classification of 1 when the at least other vehicle includes the image recognition sensor and is positioned in an end lane;
confirming, by the controller, the at least one other vehicle as a vehicle having a reliability classification of 3 when the other vehicle includes a plurality of sensors and a distance between the at least one other vehicle and the traveling vehicle is within a threshold distance.

9. The method of claim 8, wherein the confirming of the traffic lane includes:
calculating, by the controller, the distance between the at least one other vehicle and the traveling vehicle;
estimating, by the controller, the traffic lane of the traveling vehicle using the calculated distance; and
confirming, by the controller, the traffic lane of the traveling vehicle when the traffic lane of the traveling vehicle is predicted as the same traffic lane equal to or greater than a threshold.

10. A non-transitory computer readable medium containing program instructions executed by a controller for detecting a traffic lane of a traveling vehicle using wireless communication, the computer readable medium comprising:
program instructions that enter into a traffic lane recognition mode based on a user input;
program instructions that receive traffic lane recognition information from at least one other vehicle via a wireless communication;
program instructions that confirm a reliability classification of the at least one other vehicle;
program instructions that generate road driving information by making one or more predictions of the traffic lane of the traveling vehicle based on the traffic lane recognition information received from the at least one other vehicle;
program instructions that confirm a particular traffic lane of the traveling vehicle when a number of times for which the particular traffic lane has been predicted is greater than or equal to a threshold that varies according to the reliability classification of the at least one other vehicle; and
program instructions that output the road driving information including the confirmed traffic lane.

11. The non-transitory computer readable medium of claim 10, further comprising:
program instructions that confirm the reliability classification based on a sensor unit including an image recognition sensor and a radar sensor of the at least one other vehicle, coordinate values for a position of the at least one other vehicle, a distance between the at least one other vehicle and the traveling vehicle, and the traffic lane recognition information that includes a position of the traffic lane for the at least one other vehicle.

12. The non-transitory computer readable medium of claim 11, further comprising:
program instructions that confirm the at least other vehicle as a vehicle having a reliability classification of 1 when the at least other vehicle includes the image recognition sensor and is positioned in an end lane;
program instructions that confirm the at least one other vehicle as a vehicle having a reliability classification of 3 when the other vehicle includes a plurality of sensors and a distance between the at least one other vehicle and the traveling vehicle is within a threshold distance.

13. The non-transitory computer readable medium of claim 12, further comprising:
program instructions that calculate the distance between the at least one other vehicle and the traveling vehicle;
program instructions that estimate the traffic lane of the traveling vehicle using the calculated distance; and
program instructions that confirm the traffic lane of the traveling vehicle when the traffic lane of the traveling vehicle is predicted as the same traffic lane equal to or greater than a threshold.

* * * * *